United States Patent
Carreirão

(10) Patent No.: US 11,987,299 B2
(45) Date of Patent: May 21, 2024

(54) STEERING GEAR ASSEMBLY WITH MULTIPLE INPUT SHAFTS, REMANUFACTURING KIT, AND REMANUFACTURING METHODS

(71) Applicant: Volvo Truck Corporation, Gothenburg (SE)

(72) Inventor: Cláudio Carreirão, Curitiba (BR)

(73) Assignee: Volvo Truck Corporation, Gothenburg (SE)

( * ) Notice: Subject to any disclaimer, the term of this patent is extended or adjusted under 35 U.S.C. 154(b) by 705 days.

(21) Appl. No.: 17/257,404

(22) PCT Filed: Jul. 4, 2018

(86) PCT No.: PCT/BR2018/050224
§ 371 (c)(1),
(2) Date: Dec. 31, 2020

(87) PCT Pub. No.: WO2020/006614
PCT Pub. Date: Jan. 9, 2020

(65) Prior Publication Data
US 2021/0339797 A1    Nov. 4, 2021

(51) Int. Cl.
*B62D 5/083* (2006.01)
*B62D 1/04* (2006.01)
(Continued)

(52) U.S. Cl.
CPC .............. *B62D 5/083* (2013.01); *B62D 1/04* (2013.01); *B62D 5/09* (2013.01); *B62D 5/24* (2013.01)

(58) Field of Classification Search
CPC .................... B62D 5/083; B62D 5/24
See application file for complete search history.

(56) References Cited

U.S. PATENT DOCUMENTS

| 3,022,772 A | 2/1962 | Zeigler et al. |
| 3,868,888 A | 3/1975 | Rehfeld |

(Continued)

FOREIGN PATENT DOCUMENTS

| CN | 1174536 A | 2/1998 |
| CN | 1699107 A | 11/2005 |

(Continued)

OTHER PUBLICATIONS

Extended European Search Report for European Patent Application No. 18925590.4, dated Jan. 14, 2022, 7 pages.
(Continued)

*Primary Examiner* — Tony H Winner
*Assistant Examiner* — Hosam Shabara
(74) *Attorney, Agent, or Firm* — Withrow & Terranova, PLLC

(57) ABSTRACT

A steering gear assembly, which utilizes a manually-drive first rotatable input shaft coupled with a rotatable valve member to control flow of hydraulic fluid to different downstream passages, includes a torsion tube and a transfer shaft extending within the interior of the torsion tube, with the transfer shaft being configured to receive rotational force from a second rotatable input shaft coupled to a motor or another mechanical torque-supplying element. The torsion tube applies a rotational restoring force to the rotatable valve member. A removable end cover for a steering gear assembly housing includes a rotary seal permitting rotation of the transfer shaft and/or second rotatable input shaft, with the first and second rotatable input shafts opposing one another. A remanufacturing kit for a steering gear assembly includes a torsion tube, a transfer shaft, and an end cover as mentioned. A method for remanufacturing a steering gear assembly is further provided.

19 Claims, 10 Drawing Sheets

(51) Int. Cl.
  *B62D 5/09* (2006.01)
  *B62D 5/24* (2006.01)

(56) References Cited

U.S. PATENT DOCUMENTS

| | | | | |
|---|---|---|---|---|
| 4,232,586 | A | | 11/1980 | Elser |
| 4,368,794 | A | * | 1/1983 | Elser ..................... B62D 5/30 91/375 A |
| 4,373,598 | A | | 2/1983 | Elser |
| 4,417,501 | A | | 11/1983 | Elser |
| 5,139,106 | A | * | 8/1992 | Elser ..................... B62D 5/061 91/401 |
| 5,482,131 | A | * | 1/1996 | Cortes Guasch ........ B62D 5/24 91/380 |
| 7,073,620 | B2 | | 7/2006 | Braun et al. |
| 7,253,546 | B2 | | 8/2007 | Fukuda et al. |
| 9,145,164 | B2 | * | 9/2015 | Thirupathi ............... B62D 5/12 |
| 9,731,753 | B2 | * | 8/2017 | Haegele ................... B62D 5/20 |
| 11,173,954 | B2 | * | 11/2021 | Wong ..................... B62D 5/061 |
| 2005/0012421 | A1 | | 1/2005 | Fukuda et al. |
| 2015/0329141 | A1 | | 11/2015 | Preijert |

FOREIGN PATENT DOCUMENTS

| | | |
|---|---|---|
| CN | 101011979 A | 8/2007 |
| CN | 101058317 A | 10/2007 |
| CN | 101468660 A | 7/2009 |
| CN | 201999055 U | 10/2011 |
| CN | 102481948 A | 5/2012 |
| DE | 2913484 A1 | 10/1980 |
| EP | 0154388 A1 | 9/1985 |
| EP | 3035506 A1 | 6/2016 |
| JP | H05262244 A | 10/1993 |
| WO | 2013058752 A1 | 4/2013 |
| WO | 2013119147 A1 | 8/2013 |

OTHER PUBLICATIONS

First Office Action for Chinese Patent Application No. 201880095318.9, dated Sep. 21, 2022, 22 pages.
Office Action for Brazilian Patent Application No. 11202100073-9, dated Oct. 4, 2022, 5 pages.
Second Office Action for Chinese Patent Application No. 201880095318.9, dated Apr. 8, 2023, 19 pages.
Author Unknown, "How Does Steering Work?" Apr. 5, 2008, http://auto.howstuffworks.com/steering.htm, 10 pages.
Author Unknown, "Recirculating ballnut and worm assemblies steering gears," Ningbo CIE Industry and Trade Co., Ltd., accessed Apr. 7, 2018 from http://www.ddb-tech.com/recirculating-ball-type-steering-gears-02.htm, 3 pages.
Bennett, S. et al., "Chapter 25: Steering and Alignment," in Heavy-duty Truck Systems, Clifton Park, NY : Thomson Delmar Learning, 2006, 4 pages.
Carley, L. "Servicing Recirculating Ball Steering Gears," Brake & Front End, Jan. 2002, Hydraulic, Apr. 30, 2008, http://hydraulic-parts.blogspot.com/2008/04/servicing-recirculating-ball-steering.html, 6 pages.
Tagesson, K., "Truck Steering System and Driver Interaction," Thesis for the Degree of Licentiate of Engineering, in Machine and Vehicle Systems, Department of Applied Mechanics, Chalmers University of Technology, Göteborg, Sweden, 2014, 84 pages.
International Search Report and Written Opinion for International Patent Application No. PCT/BR2018/050224, dated Dec. 7, 2018, 14 pages.
International Preliminary Report on Patentability for International Patent Application No. PCT/BR2018/050224, dated Jan. 14, 2021, 13 pages.
Office Action for Brazilian Patent Application No. 11202100073-9, mailed Oct. 23, 2023, 6 pages.
Examination Report for European Patent Application No. 18925590.4, mailed Nov. 10, 2023, 5 pages.

* cited by examiner

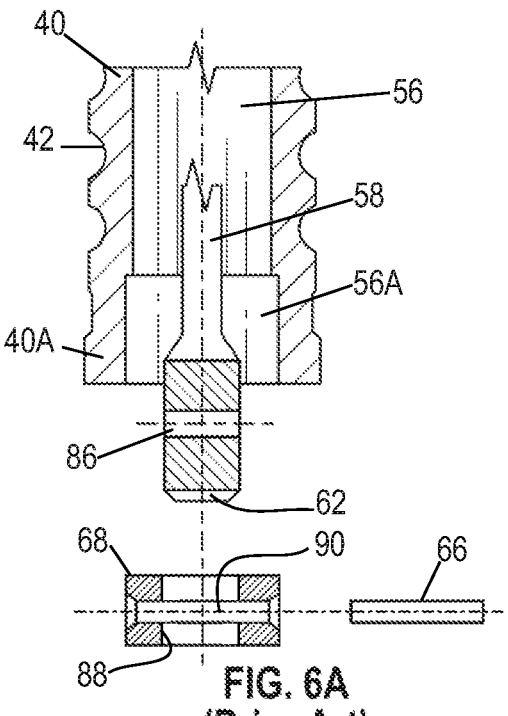
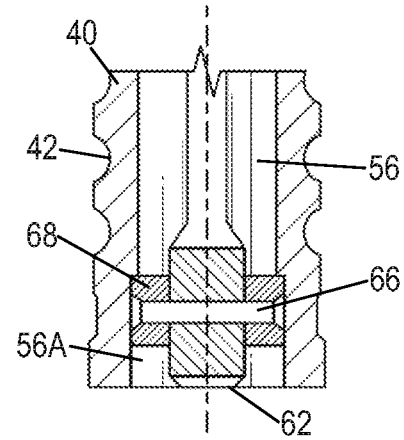
FIG. 6A
(Prior Art)
FIG. 6B
(Prior Art)
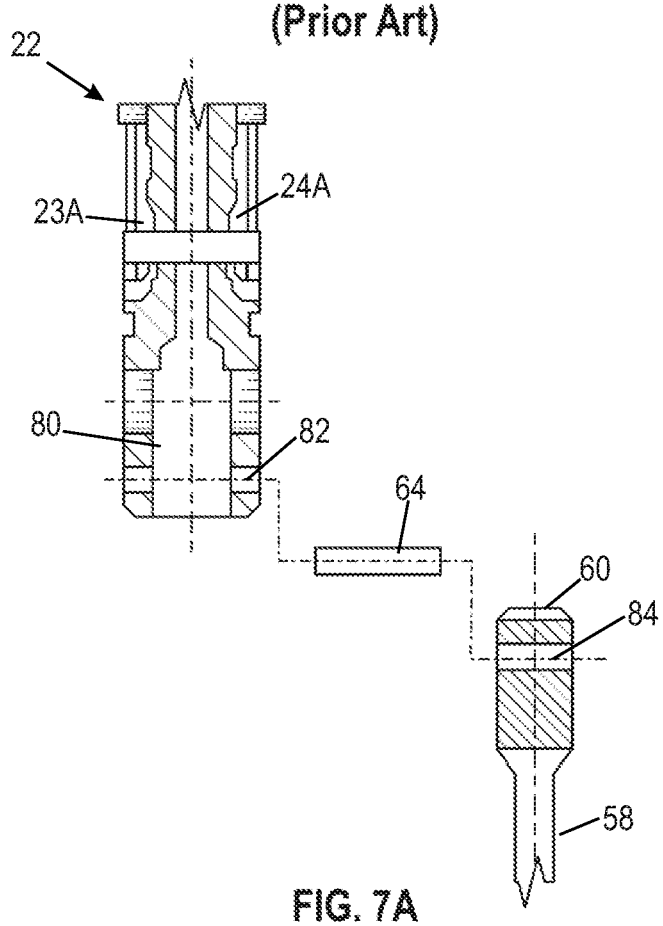
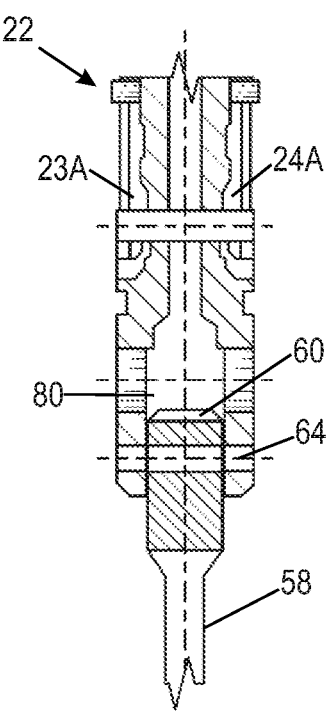
FIG. 7A
(Prior Art)
FIG. 7B
(Prior Art)

STEERING GEAR ASSEMBLY WITH MULTIPLE INPUT SHAFTS, REMANUFACTURING KIT, AND REMANUFACTURING METHODS

CROSS-REFERENCE TO RELATED APPLICATION(S)

This application is the U.S. national phase under 35 U.S.C. § 371 of International Application No. PCT/BR2018/050224 filed on Jul. 4, 2018, wherein the entire contents of the foregoing application are hereby incorporated by reference herein.

TECHNICAL FIELD

The present disclosure relates to a hydraulic steering gear assembly (especially for a commercial or industrial vehicle such as a truck, bus, or construction equipment) permitting manual operation and motor-driven (e.g., autonomous) or motor-assisted operation. The disclosure further relates to a remanufacturing kit and remanufacturing method for adapting an existing hydraulic steering gear assembly to include a motor (or another mechanical torque-supplying element), to permit manual operation as well as permit motor-driven or motor-assisted operation, without requiring relocation of the steering gear assembly or associated output components.

BACKGROUND

Operators of fleets of commercial and industrial vehicles (such as heavy trucks, buses, construction equipment, and the like) increasingly seek to employ autonomous (e.g., self-driving) vehicle technology to reduce labor costs, reduce operator stress, increase vehicular utilization, increase efficiency, and promote enhanced safety. For example, laws in various countries limit the number of hours that truck drivers and heavy equipment operators can operate per day for safety reasons, and autonomous driving capabilities may enable such laws to be relaxed for driver-occupied vehicles, or to be rendered moot for driverless vehicles.

Despite advances in autonomous vehicle technologies, there remains a need for commercial and industrial vehicles capable of both autonomous and manual operation. For example, autonomous driving operation is relatively simple to program and implement on long highways with controlled road access (via predictable on- and off-ramps) and little or no cross-traffic, whereas driving in urban environments may be dramatically less predictable due to congested roads, presence of pedestrians and/or bicyclists, and highly variable traffic patterns. It may be desirable to have a truck driver manually control a truck from an urban pick-up point to a highway, then set the truck for autonomous operation on the highways, and then have the truck driver resume manual control of the truck after exiting from the highway until arriving at an urban drop-off point.

New vehicles capable of autonomous operation may include electrically operated steering systems (as well as electrically operated acceleration and deceleration systems); however, numerous older vehicles are not so equipped.

Power assisted steering systems have been standard features in conventional driver-operated vehicles for many years, particularly in commercial and industrial vehicles. The most common front axle steering arrangement for driver-operated commercial and industrial vehicles includes a recirculating ball-type hydraulic steering gear system, in which high pressure hydraulic fluid is used to amplify the force mechanically transmitted by the steering wheel to the steered wheels of the vehicle. A power assisted steering system permits a driver to exert less effort when turning the steering wheel, thus making a vehicle easier to maneuver. A massive number of commercial and industrial vehicles including hydraulic steering gear systems are currently in operation worldwide.

It is known to position an electric motor between a steering wheel and a hydraulic steering gear to permit a control system and the electric motor to assist a hydraulic steering gear. Such a system is embodied in the Volvo Dynamic Steering (VDS) system utilized in new commercial and industrial vehicles produced by Volvo Bus Corporation (Göteborg, Sweden) and Volvo Trucks (Göteborg, Sweden). The VDS system reads various signals (e.g., vehicle speed, steering angle, torque supplied by the driver, etc.) and calculates all variables to obtain optimal steering input. At low speeds, additional force may be supplied to a power steering mechanism to adapt assistance to the actual need in each situation. When driving straight ahead, road irregularities as well as directional deviations may be detected thousands of times per second, and directional deviation may be corrected with the same frequency, thereby sparing the driver from constantly correcting travel direction. The electric motor may also automatically return the steering wheel to center in driver-selected operation, thereby avoiding driver strain when undergoing tight maneuvers. The motor-assisted operation provided by the VDS system may beneficially enhance vehicle stability and reduce driver fatigue.

One obstacle to remanufacturing conventional driver-operated vehicles for autonomous operation and/or to include dynamic steering control (e.g., including functionality provided by Volvo's VDS system) is the cost and complexity of replacing or augmenting power assisted hydraulic steering systems. Conventional hydraulic steering gear assemblies have a single input shaft. Although it is known (e.g., as embodied in the VDS system) to position an electric motor between a steering wheel and a hydraulic steering gear assembly, it is not trivial to remanufacture a hydraulic steering gear assembly of an existing truck to receive an electric motor. That is because modification of a steering system to allow an electric steering motor to be installed between the steering wheel and the steering gear assembly would require the steering gear assembly to be repositioned, thereby creating the need for a new steering gear mount as well as new output components such as a new Pitman arm, a new drag link, and the like. Such modifications would require new tooling as well as validation of any new steering system parts for every vehicle on which an electric steering motor is remanufactured.

To provide context for the subject matter of the present disclosure, a conventional hydraulic steering gear assembly 10 of a recirculating ball-type, and various components thereof, are illustrated in FIGS. 1-9B. Referring to FIG. 1, the hydraulic steering gear assembly 10 includes a housing 12 having a first end 14 and a second end 16. An input shaft 18 extends through the first end of the housing 12 and is arranged to receive rotary force supplied by a vehicle steering wheel (not shown). A hydraulic fluid inlet 20 is arranged proximate to the first end 14 of the housing 12, and a hydraulic fluid recirculation outlet 21 is arranged proximate to the second end 16 of the housing 12. The input shaft 18 is coupled with a rotatable valve member 22 that selectively admits fluid into a first downstream passage 23 and a second downstream passage 24. The first downstream passage 23 permits fluid communication with a first chamber 26 bounded in part by a first end 28 of a ball nut piston 30, and the second downstream passage 24 permits fluid communication with a second chamber 32 bounded in part by a second end 34 of the ball nut piston 30. The ball nut piston includes a piston bore 36 that defines inner spiral grooves 38, with the piston bore 36 receiving a worm shaft 40 that defines outer spiral grooves 42, wherein the inner and outer spiral grooves 38, 42 are configured to guide the movement of recirculating balls 44 between the ball nut piston 30 and the worm shaft 40. The ball nut piston 30 further includes external teeth 46 that are configured to engage teeth 48 of a sector shaft 50 that is rotatable about a rotational center 52 and is coupled to a Pitman arm 54 (with a portion thereof illustrated in hidden lines). The ball nut piston 30 is configured to translate relative to the worm shaft 40. The worm shaft 40 defines an inner bore 56 that contains a torsion bar 58 having a first end 60 coupled to the rotatable valve member 22, and having a second end 62 coupled to the worm shaft 40, with the torsion bar 58 serving to provide a restoring force to the rotatable valve member 22 and the input shaft 18. The torsion bar 58 is coupleable to the rotatable valve member 22 with a first connecting pin 64 (optionally extending through a first intermediate joining member, not shown in FIG. 1), and is coupleable to the worm shaft 40 with a second connecting pin 66 extending through a second intermediate joining member 68. A removable end cover 70 and bolts 72 are positioned at the second end 16 of the housing 12, with the hydraulic fluid recirculation outlet 21 extending through a fitting 74 arranged in or on the removable end cover 70. The hydraulic steering gear assembly 10 further includes a bypass valve 76 arranged between the hydraulic fluid inlet 20 and a hydraulic fluid bypass line 78, which extends to the hydraulic fluid recirculation outlet 21. FIG. 1 shows the hydraulic steering gear assembly 10 in a neutral or straight position, with the rotatable valve assembly 22 positioned to disallow passage of hydraulic fluid into the first and second chambers 26, 32, such that hydraulic fluid supplied to the hydraulic fluid inlet 20 will pass through the bypass valve 76 and the hydraulic fluid bypass line 78 to exit the hydraulic steering gear assembly 10 through the hydraulic fluid recirculation outlet 21, to be returned to a hydraulic fluid pump (not shown).

FIGS. 2-8 illustrate various components of the hydraulic steering gear assembly 10. FIG. 2 illustrates the rotatable valve member 22 and input shaft 18, showing the rotatable valve member 22 as including first and second fluid ports 23A, 24A permitting the passage of hydraulic fluid, and further including a recess 80 defining transverse pin receiving holes 82. FIG. 3 illustrates the torsion bar 58, which includes a first transverse pin receiving hole 84 proximate to a first end 60, and includes a second transverse pin receiving hole 86 proximate to a second end 62. FIG. 4 illustrates a portion of the ball nut piston 30, showing external teeth 46 along one side thereof, and showing the piston bore 36 defining inner spiral grooves 38. FIG. 5 illustrates the sector shaft 50 having multiple teeth 48 and a rotational center 52. FIG. 6A is an exploded cross-sectional view illustrating distal portions of the torsion bar 58 and the worm shaft 40, as well as the second intermediate joining member 68 and a (second) connecting pin 66. The worm shaft 40 includes outer spiral grooves 42 and an inner bore 56 that receives the torsion bar 58, and includes a widened bore portion 56A configured to receive the second intermediate joining member 68 and positioned along an end portion 40A of the worm shaft 40. The second intermediate joining member 68 defines transverse pin receiving holes 90 configured to receive the (second) connecting pin 66, and a longitudinal bore 88 configured to receive the second end 62 of the torsion bar 58. FIG. 6B illustrates the same items shown in FIG. 6A following assembly, with the connecting pin 66 extending through transverse pin receiving holes 86, 90 defined in the torsion bar 58 and the second intermediate joining member 68, respectively, and with the second intermediate joining member 68 received within the widened bore portion 56A of the worm shaft 40. FIG. 7A is an exploded, cross-sectional view showing a proximal portion of the torsion bar 58 (including a transverse pin receiving hole 84 proximate to the first end 60), in addition to the rotatable valve member 22 and a (first) connecting pin 64. The rotatable valve member 22 includes first and second fluid ports 23A, 24A as well as a recess 80 defining transverse pin receiving holes 82. FIG. 7B illustrates the same items shown in FIG. 7A following assembly, with the connecting pin 64 extending through transverse pin receiving holes 84, 82 defined in the torsion bar 58 and the rotatable valve member 22. FIG. 8 illustrates the worm shaft 40, showing spiral grooves 42 defined in an outer surface thereof, and including an inner bore 56 having a widened bore portion 56A proximate to an end portion 40A.

FIGS. 9A and 9B depict the hydraulic steering gear assembly of FIG. 1 in two different states of operation, causing the sector shaft 50 to rotate in two different directions (i.e., counterclockwise and clockwise, respectively). The majority of the elements depicted in FIGS. 9A and 9B are the same as described in FIG. 1, and will not be described again for sake of brevity.

FIG. 9A shows a state of operation in which torque applied to the input shaft 18 (e.g., supplied by manipulation of a vehicle steering wheel (not shown)) causes the rotatable valve member 22 to turn in a first direction, permitting pressurized hydraulic fluid supplied through the hydraulic fluid inlet 20 to pass the rotatable valve member 22 into the first downstream passage 23 and into the first chamber 26 to contact the first end 28 of the ball nut piston 30. Presence of hydraulic fluid in this location exerts a force F1 (indicated by small downwardly pointing arrows) on the first end 28 of the ball nut piston 30, causing the ball nut piston 30 to move in a first direction D1 (indicated by a single large downwardly pointing arrow). This movement of the ball nut piston 30 causes external teeth 46 of the ball nut piston 30 to engage corresponding teeth 48 of the sector shaft 50, thereby causing the sector shaft 50 to undergo counterclockwise rotation R1 (indicated by a curved arrow) within a side cavity 92 of the housing 12. With the sector shaft 50 being coupled to the Pitman arm 54, the counterclockwise rotation of the sector shaft 50 causes the Pitman arm 54 to undergo pivotal movement P1 (indicated by a rightwardly pointing arrow) and effectuate turning of wheels of a motor vehicle via one or more links (not shown) coupleable to the Pitman arm 54. While torque is applied to the input shaft 18 to permit turning of the vehicle, the applied torque also serves to angularly deform (i.e., twist) the torsion bar 58 that is coupled to the rotatable valve member 22, causing the torsion bar 58 to exert a rotational restoring force tending to return the rotatable valve member 22 to a neutral position as described above in connection with FIG. 1.

FIG. 9B shows a state of operation in which torque applied to the input shaft causes the rotatable valve member to turn in a second direction, permitting pressurized hydraulic fluid supplied through the hydraulic fluid inlet 20 to pass the rotatable valve member 22 into the second downstream passage 24, through the piston bore 36 of the ball nut piston 30 (along an outer surface of the worm shaft 40), and into the second chamber 32 to contact the second end 34 of the ball nut piston 30. Presence of hydraulic fluid in this location exerts a force F2 (indicated by small upwardly pointing arrows) on the second end 34 of the ball nut piston 30, causing the ball nut piston 30 to move in a second direction D2 (indicated by a single large upwardly pointing arrow). This movement of the ball nut piston 30 causes external teeth 46 of the ball nut piston 30 to engage corresponding teeth 48 of the sector shaft 50, thereby causing the sector shaft 50 to undergo clockwise rotation R2 (indicated by a curved arrow) within the side cavity 92 of the housing 12. With the sector shaft 50 being coupled to the Pitman arm 54, the clockwise rotation of the sector shaft 50 causes the Pitman arm 54 to undergo pivotal movement P2 (indicated by a leftwardly pointing arrow) and effectuate turning of wheels of a motor vehicle via one or more links (not shown) coupleable to the Pitman arm 54. As before, the torque applied to the input shaft 18 serves to angularly deform or twist the torsion bar 58 that is coupled to the rotatable valve member 22, causing the torsion bar 58 to exert a rotational restoring force tending to return the rotatable valve member 22 to a neutral position as described above in connection with FIG. 1.

It can be seen from FIGS. 1-9B that a conventional hydraulic steering gear assembly 10 is well-suited for amplifying force mechanically transmitted by a vehicle steering wheel to the steered wheels of the vehicle, while providing a rotational restoring force to assist in returning the steered wheels of the vehicle to straight or neutral position after a turning operation is complete. However, it is not a trivial operation to retrofit an electric motor to a hydraulic steering gear assembly without relocating the assembly and relocating associated output components, with the attendant costs of recertifying a modified steering system.

In view of the foregoing, need exists in the art for the ability to economically remanufacturing hydraulic steering gear assemblies of conventional driver-operated vehicles to receive motors (or other mechanical torque-supplying elements) to enable autonomous and/or driver-assisted operation.

SUMMARY

A steering gear assembly, which employs a rotatable valve member coupled with a manually-driven first rotatable input shaft to control flow of hydraulic fluid to different downstream passages, includes a torsion tube configured to apply a rotational restoring force to the rotatable valve member and the first rotatable input shaft, and includes a transfer shaft that extends within the interior of the torsion tube and that is configured to receive rotational force from a second rotatable input shaft coupled to a motor (e.g., an electric motor or hydraulic motor) or another mechanical torque-supplying element. The rotatable valve member is configured to rotate upon receipt of torque from either of the first rotatable input shaft or the second rotatable input shaft. The steering gear assembly may include a housing with a removable end cover that includes a rotary seal permitting rotation of the transfer shaft and/or the second rotatable input shaft relative to the end cover, with the second rotatable input shaft generally opposing the first rotatable input shaft. A remanufacturing kit for a steering gear assembly includes a torsion tube, a transfer shaft, and an end cover as mentioned. A method for remanufacturing a steering gear assembly includes replacing a torsion bar configured to apply a rotational restoring force to a first rotatable input shaft with a torsion tube configured to apply such a rotational restoring force, and providing a transfer shaft extending within an interior of the torsion tube and coupled to a rotatable valve member, with the transfer shaft extending between a second rotatable input shaft and the rotatable valve member, and the rotatable valve member being configured to rotate with the first and the second rotatable input shafts.

Replacement of a torsion bar with a torsion tube and a transfer shaft contained therein permits a second rotatable input shaft (with associated electric or hydraulic motor) to be added to a steering gear assembly and positioned generally opposing the first rotatable input shaft, without requiring the steering gear assembly to be relocated, which would also entail modifying output components (e.g., Pitman arm, drag links, etc.) associated with the steering gear assembly. In this manner, steering gear assemblies of conventional driver-operated vehicles may be economically remanufactured with electric or hydraulic motors to enable autonomous and/or driver-assisted operation.

In one aspect, the disclosure relates to a steering gear assembly for a vehicle that includes a first rotatable input shaft, a rotatable valve member, a torsion tube, a second rotatable input shaft, and a transfer shaft. The rotatable valve member is coupled with the first rotatable input shaft, and is configured to control flow of hydraulic fluid from a hydraulic fluid inlet to a first downstream passage and a second downstream passage. The torsion tube is configured to apply a rotational restoring force to the rotatable valve member and the first rotatable input shaft. The transfer shaft extends within the interior of the torsion tube and is coupled to the rotatable valve member and the second rotatable input shaft. The rotatable valve member is configured to rotate upon receipt of torque from either of the first rotatable input shaft or the second rotatable input shaft.

In certain embodiments, the first rotatable shaft is configured to receive a first rotational force supplied by manual rotation of a steering wheel, and the second rotatable shaft is configured to receive a second rotational force supplied by a motor (e.g., an electric motor or hydraulic motor) or another mechanical torque-supplying element.

In certain embodiments, the transfer shaft is integrally formed with the second rotatable input shaft. In certain embodiments, the rotatable valve member valve is integrally formed with the first rotatable input shaft.

In certain embodiments, the transfer shaft is directly coupled to one or both of the rotatable valve member and the second rotatable input shaft. In certain embodiments, the transfer shaft is indirectly coupled to one or both of the rotatable valve member and the second rotatable input shaft.

In certain embodiments, the steering gear assembly further includes a ball nut piston operatively coupled with a sector shaft to cause the sector shaft to rotate in a first rotational direction when the ball nut piston is displaced in a first linear direction, and to cause the sector shaft to rotate in a second rotary direction when the ball nut piston is displaced in a second linear direction. The second rotational direction is opposite the first rotational direction, and the second linear direction is opposite the first linear direction. Rotation of the first input shaft and the second input shaft causes the rotatable valve member to selectively admit fluid into the first downstream passage or the second downstream passage to displace the ball nut piston in the first linear direction or the second linear direction, respectively.

In certain embodiments, the ball nut piston defines a piston bore having an inner surface and defining a first spiral groove, and the steering gear assembly further includes a worm shaft and a plurality of recirculating balls. The worm shaft extends through the piston bore, includes an outer surface defining a second spiral groove, and defines a worm shaft bore containing the torsion tube and at least a portion of the transfer shaft. The recirculating balls are positioned between the first spiral groove and the second spiral groove.

In certain embodiments, the steering gear assembly includes a housing defining at least one cavity containing the ball nut piston, the worm shaft, the sector shaft, the torsion tube, the rotatable valve member, and the transfer shaft. An end cover is removably coupled to the housing and bounding at least a portion of the cavity, with the end cover including a rotary seal that permits rotation of the transfer shaft and/or the second rotatable input shaft relative to the end cover.

In certain embodiments, the end cover includes a hydraulic fluid outlet that is displaced relative to the rotary seal. In certain embodiments, the end cover includes an end face and at least one lateral face, the rotary seal is positioned in or on the end face, and the hydraulic fluid outlet is positioned in or on the at least one lateral face. In certain embodiments, the end cover includes a recess configured to receive an end portion of the worm shaft.

Certain embodiments are directed to a land vehicle (e.g., an on-road vehicle or off-road vehicle including steerable wheels) comprising a steering gear assembly as described herein.

In another aspect, the disclosure relates to a remanufacturing kit for a steering gear assembly being controllable by a first rotatable input shaft to enable the steering assembly to be controllable by the first rotatable input shaft and by a second rotatable input shaft that generally opposes the first rotatable input shaft, the remanufacturing kit including a torsion tube, a transfer shaft, and an end cover. The torsion tube is configured to be received within an inner bore of a worm shaft of the steering gear assembly, configured to be coupled proximate to a first end thereof to a rotatable valve member of the steering gear assembly, and configured to be coupled at a second end thereof along an inner bore of a worm shaft. The transfer shaft is configured to be received within an inner bore of the torsion tube, and configured to be coupled at a first end thereof to both the rotatable valve member and the first end of the torsion tube. The end cover is configured to be removably coupled to a housing of the steering gear assembly, wherein the end cover comprises a rotary seal configured to permit rotation of the transfer shaft relative to the end cover.

In certain embodiments, the end cover includes a hydraulic fluid outlet that is displaced relative to the rotary seal.

In certain embodiments, the transfer shaft either includes or is coupled with a second rotatable input shaft, and the second rotatable input shaft is configured for coupling to a motor (e.g., an electric motor or hydraulic motor) or another mechanical torque-supplying element. In certain embodiments, the transfer shaft either includes or is coupled with a second rotatable input shaft, and the remanufacturing kit further comprises a motor, or another mechanical torque-supplying element, coupleable to the second rotatable input shaft.

In certain embodiments, an intermediate joining member is configured to be arranged between the second end of the torsion tube and an inner surface of the worm shaft. The intermediate joining member includes a longitudinal bore, a first transverse pin receiving hole, and a second transverse pin receiving hole, with the longitudinal bore being configured to receive a second end portion of the torsion tube. A first distal retaining pin is configured to extend through a first distal pin receiving hole of the torsion tube and through the first transverse pin receiving hole of the intermediate joining member, and a second distal retaining pin is configured to extend through a second distal pin receiving hole of the torsion tube and through the second transverse pin receiving hole of the intermediate joining member.

In certain embodiments, the torsion tube includes a first proximal pin receiving hole and a second proximal pin receiving hole, and the transfer shaft includes a transfer shaft pin receiving hole. The torsion tube and the transfer shaft are configured to be coupled to the rotatable valve member via a proximal retaining pin extending through the first proximal pin receiving hole, the transfer shaft pin receiving hole, the second proximal pin receiving hole, and pin receiving holes defined in the rotatable valve member.

In another aspect, the disclosure relates to a method for remanufacturing a steering gear assembly controllable by a first rotatable input shaft to cause the vehicular steering system to be controllable by the first rotatable input shaft and by a second rotatable input shaft that generally opposes the first rotatable input shaft. The method includes replacing (i) a torsion bar configured to apply a rotational restoring force to the first rotatable input shaft with (ii) a torsion tube configured to apply a rotational restoring force to the first rotatable input shaft, wherein the first rotatable input shaft is coupled with a rotatable valve member arranged between a hydraulic fluid inlet and first and second downstream passages. The rotatable valve member is configured to selectively direct hydraulic fluid to the first downstream passage or to the second downstream passage. The method further includes providing a transfer shaft extending within an interior of the torsion tube and coupled to the rotatable valve member. The transfer shaft extends between the second rotatable input shaft and the rotatable valve member, and the rotatable valve member is configured to rotate upon receipt of torque from either of the first rotatable input shaft or the second rotatable input shaft.

In certain embodiments, the method further includes replacing an end cover of a housing of the steering gear assembly with a replacement end cover, with the replacement end cover including a rotary seal permitting rotation of the transfer shaft and/or the second rotatable input shaft relative to the replacement end cover.

In certain embodiments, the method further includes providing an intermediate joining member between an inner surface of the worm shaft and an end portion of the torsion tube proximate to the replacement end cover, and utilizing multiple retaining pins with the intermediate joining member. Specifically, the method includes inserting a first distal retaining pin through a first distal pin receiving hole of the torsion tube and through a first transverse pin receiving hole of the intermediate joining member, as well as inserting a second distal retaining pin through a second distal pin receiving hole of the torsion tube and through a second transverse pin receiving hole of the intermediate joining member.

In certain embodiments, the torsion tube includes a first proximal pin receiving hole and a second proximal pin receiving hole, and the transfer shaft includes a transfer shaft pin receiving hole. According to such embodiment(s), the method further includes coupling the transfer shaft, torsion tube, and rotatable valve member by inserting a proximal retaining pin through the first proximal pin receiving hole, transfer shaft pin receiving hole, the second proximal pin receiving hole, and pin receiving holes defined in the rotatable valve member.

In another aspect, any of the foregoing aspects, and/or various separate aspects and features as described herein, may be combined for additional advantage. Any of the various features and elements as disclosed herein may be combined with one or more other disclosed features and elements unless indicated to the contrary herein.

Those skilled in the art will appreciate the scope of the present disclosure and realize additional aspects thereof after reading the following detailed description of the preferred embodiments in association with the accompanying drawings.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 6A is an exploded cross-sectional view showing distal portions (i.e., distal from the input shaft) of the torsion bar and the worm shaft, as well as an intermediate joining member and a connecting pin permitting the torsion bar to be coupled to the worm shaft, with all of the foregoing items being part of the conventional steering gear assembly of FIG. 1.

FIG. 6B is a cross-sectional view of the components of FIG. 6A in an assembled state.

FIG. 7A is an exploded, cross-sectional view showing a proximal portion (i.e., proximal to the input shaft) of the torsion bar in addition to the rotatable valve member and a connecting pin, with the foregoing items being part of the conventional steering gear assembly of FIG. 1.

FIG. 7B is a cross-sectional view of the components of FIG. 7A in an assembled state.

DETAILED DESCRIPTION

Figure 1:
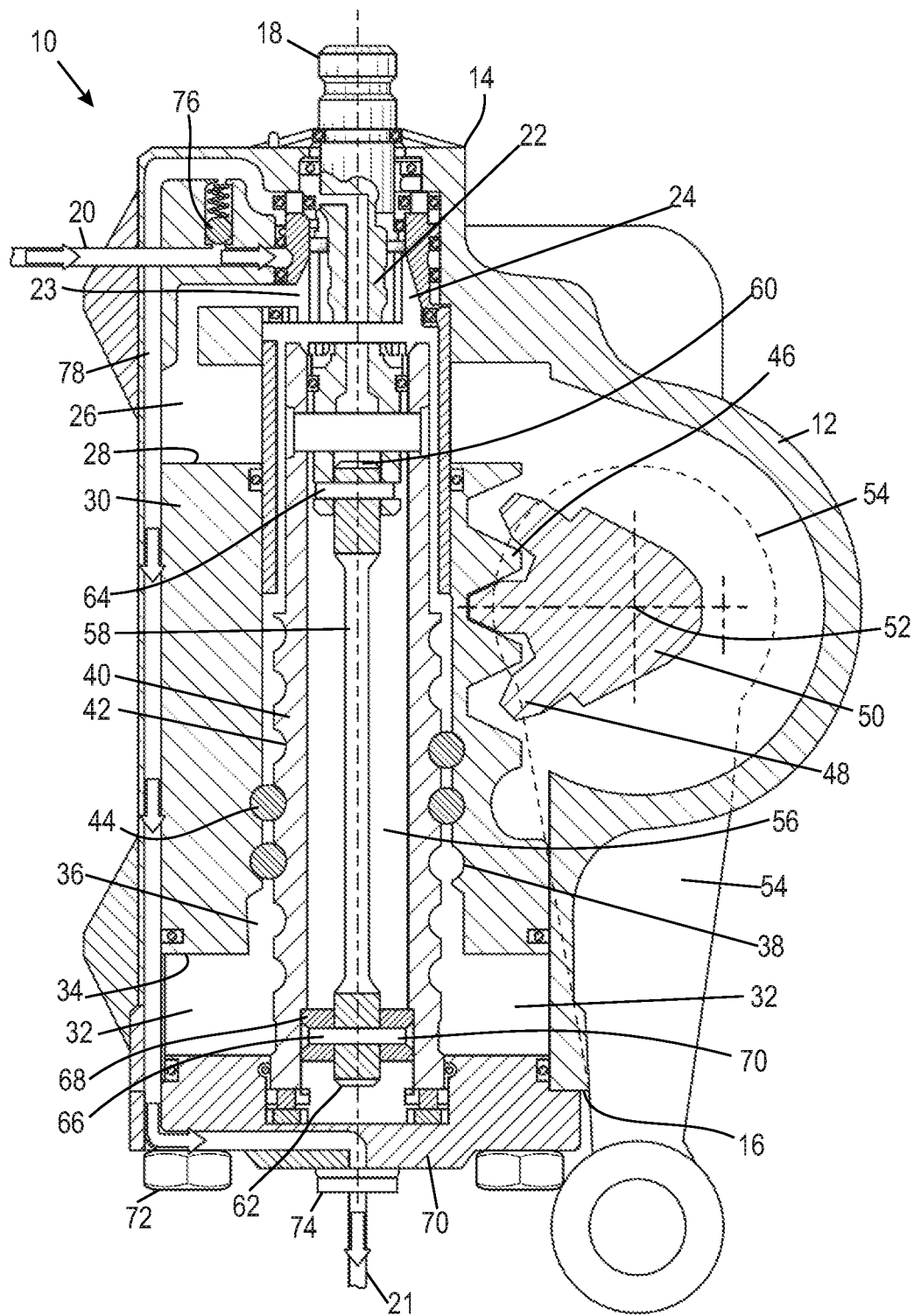
FIG. 1 is a cross-sectional view of a conventional hydraulic steering gear assembly having a single input shaft coupled with a rotatable valve member to control flow of hydraulic fluid, with a torsion bar coupled to a recirculating shaft and being configured to provide a restoring force to the rotatable valve and input shaft, and with the steering gear assembly in a neutral or straight position.
Figure 2:
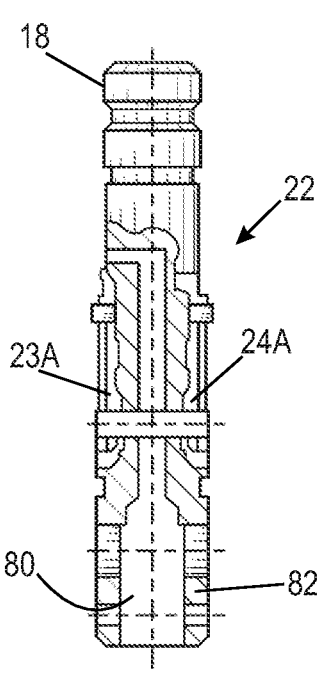
FIG. 2 is a partial cross-sectional view of the rotatable valve of the conventional steering gear assembly of FIG. 1.
Figure 3:
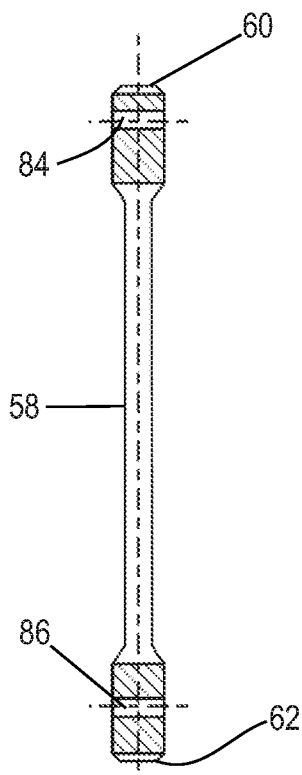
FIG. 3 is a partial cross-sectional view of the torsion bar of the conventional steering gear assembly of FIG. 1.
Figure 4:
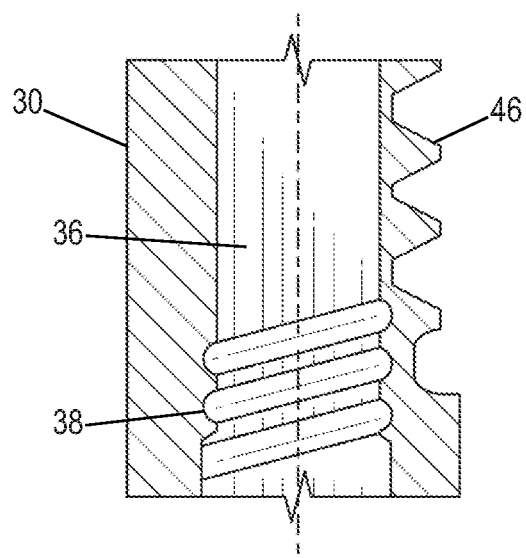
FIG. 4 is a cross-sectional view of a portion of a ball nut piston of the conventional steering gear assembly of FIG. 1.
Figure 5:
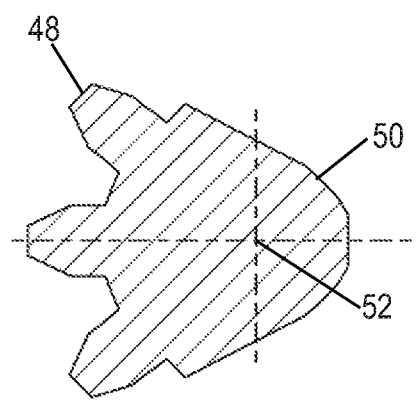
FIG. 5 is a cross-sectional view of the sector shaft of the conventional steering gear assembly of FIG. 1.
Figure 8:
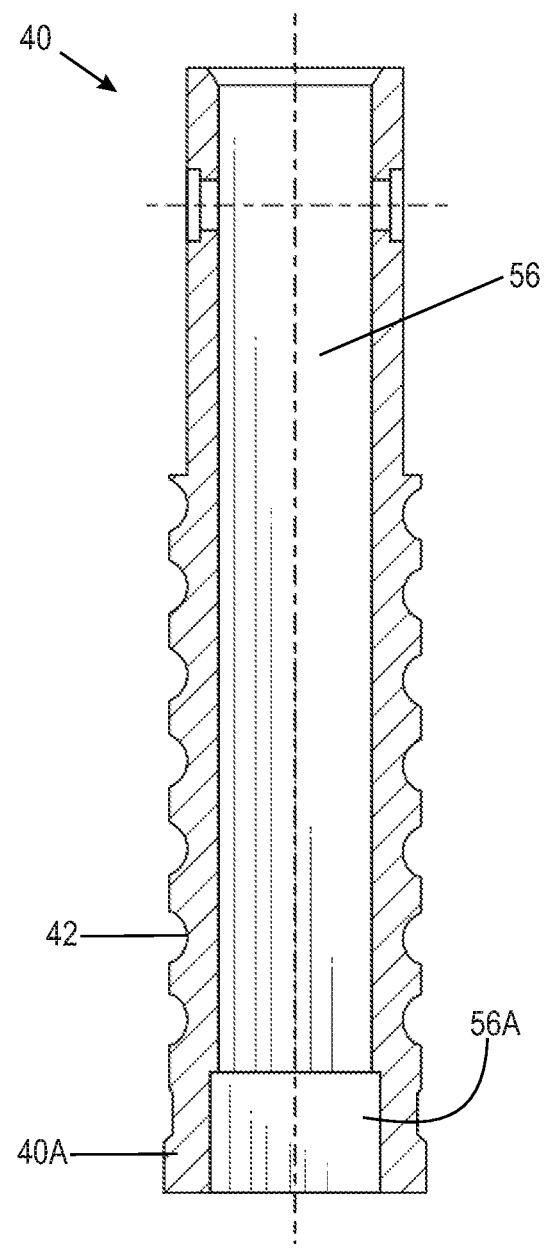
FIG. 8 is a cross-sectional view of the worm shaft of the conventional steering gear assembly of FIG. 1.

The present disclosure is directed to a steering gear assembly, a remanufacturing kit, and a remanufacturing method that augment a conventional hydraulic steering gear assembly having a manually-driven first (single) rotatable input shaft to include a second rotatable input shaft coupleable to a motor, thereby permitting manual operation as well as motor-driven (e.g., autonomous) or motor-assisted operation. Instead of using a conventional torsion bar to provide a rotational restoring force, a steering gear assembly according to the present disclosure utilizes a torsion tube and a transfer shaft contained therein, permitting the second rotatable input shaft to be positioned generally opposite the first rotatable input shaft, without requiring the steering gear to be relocated or requiring output components associated with the steering gear assembly to be modified. In this manner, steering gear assemblies of conventional driver-operated vehicles may be economically remanufactured to enable autonomous and/or driver-assisted operation.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Figure 10:
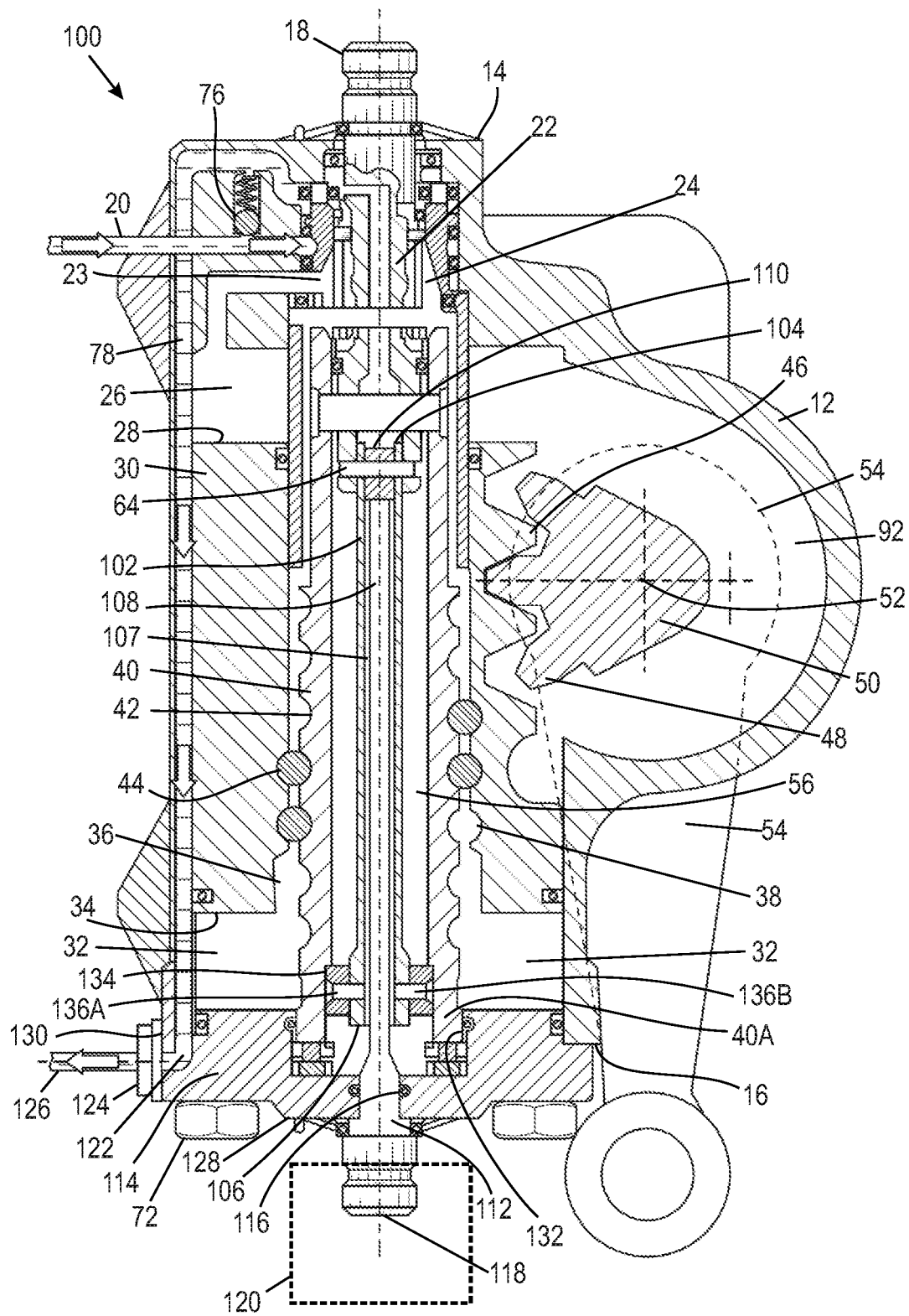
FIG. 10 is a cross-sectional view of a hydraulic steering gear assembly according to an embodiment of the present disclosure, including a first input shaft coupled with a rotatable valve member to control flow of hydraulic fluid, a torsion tube coupled to a recirculating shaft and being configured to provide a restoring force to the rotatable valve and input shaft, a transfer shaft extending through an interior of the torsion tube and coupled with both the valve member and the torsion tube, and a second input shaft coupled to the transfer shaft.

FIG. 10 is a cross-sectional view of a hydraulic steering gear assembly 100 according to an embodiment of the present disclosure. A majority of the elements of the steering gear assembly 100 are identical to those disclosed in FIG. 1, with the identical elements being correspondingly numbered in FIG. 10. Notable differences between the steering gear assembly 100 of FIG. 10 and the steering gear assembly 10 of FIG. 1 include the presence of a torsion tube 102 (having a first end 104, a second end 106, and a bore 107) and a transfer shaft 108 (having a first end 110 and a second end portion 112, and contained within the bore 107 of the torsion tube) both coupled via a connecting pin 64 at first ends 104, 110 thereof to the rotatable valve member 22. Additionally, the steering gear assembly 100 includes a different end cover 114 coupled to the second end 106 of the housing 12. The end cover 114 includes a rotary seal 116 (optionally including one or more bearings) permitting rotation of the second end portion 112 of the transfer shaft 108, which extends through the end cover 114. The second end portion 112 of the transfer shaft 108 is also coupled to, or integrally formed with, a second input shaft 118 that is coupleable (or coupled) with a motor 120 (e.g., an electric motor or hydraulic motor). The end cover 114 also includes an internal hydraulic fluid passage 122 arranged to receive hydraulic fluid from the hydraulic fluid bypass line 78, with the internal hydraulic fluid passage 122 being arranged upstream of a fitting 124 and a hydraulic fluid outlet 126. As shown, the end cover 114 includes an end face 128 and a lateral face 130, with the hydraulic fluid outlet 126 being positioned on the lateral face 130 and being displaced (or laterally offset) relative to the rotary seal 116 and relative to the second end portion 112 of the transfer shaft 108. The end cover 114 further defines a recess 132 in which the end portion 40A of the worm shaft 40 is received. Proximate to the end portion 40A of the worm shaft 40, an intermediate joining member 134 is provided to retain the second end 106 of the torsion tube 102 with first and second distal pins 136A, 136B.

As noted previously, the steering gear assembly 100 of FIG. 10 includes numerous features identical to the steering gear assembly 10 of FIG. 1. Referring to FIG. 10, the steering gear assembly 100 includes a housing 12 having a first end 14 and a second end 16. An input shaft 18 extends through the first end of the housing 12 and is arranged to receive rotary force supplied by a vehicle steering wheel (not shown). A hydraulic fluid inlet 20 is arranged proximate to the first end 14 of the housing 12. The input shaft 18 is coupled with a rotatable valve member that selectively admits fluid into a first downstream passage 23 and a second downstream passage 24. The first downstream passage 23 is coupled with a first chamber 26 bounded in part by a first end 28 of a ball nut piston 30, and the second downstream passage 24 is coupled with a second chamber 32 bounded in part by a second end 34 of the ball nut piston 30. The ball nut piston 30 includes a piston bore 36 that defines inner spiral grooves 38, with the piston bore 36 receiving a worm shaft 40 that defines outer spiral grooves 42, wherein the inner and outer spiral grooves 38, are configured to guide the movement of recirculating balls 44 between the ball nut piston 30 and the worm shaft 40. The ball nut piston 30 further includes external teeth 46 that are configured to engage teeth 48 of a sector shaft 50 that is rotatable about a rotational center 52 and is coupled to a Pitman arm 54. The ball nut piston 30 is configured to translate relative to the worm shaft 40. The worm shaft 40 is immovable relative to the housing 12 and defines an inner bore 56 that contains the torsion tube 102, with the torsion tube 102 including a bore 107 that contains the transfer shaft 108. The torsion tube 102 serves to provide a restoring force to the rotatable valve member 22, the first input shaft 18, and the second input shaft 118. The end cover 114 is attached to the second end 16 of the housing 12 using bolts 72. A bypass valve 76 is arranged between the hydraulic fluid inlet 20 and a hydraulic fluid bypass line 78, which extends to the internal hydraulic fluid passage 122 in fluid communication with the hydraulic fluid recirculation outlet 21.

FIG. 10 shows the steering gear assembly 100 in a neutral or straight position, with the rotatable valve assembly 22 positioned to disallow passage of hydraulic fluid into the first and second chambers 26, 32, such that hydraulic fluid supplied to the hydraulic fluid inlet 20 will pass through the bypass valve 76, the hydraulic fluid bypass line 78, and the internal hydraulic fluid passage 122 to exit the hydraulic steering gear assembly 10 through the hydraulic fluid outlet 126, to be returned to a hydraulic fluid pump (not shown).

Figure 11:
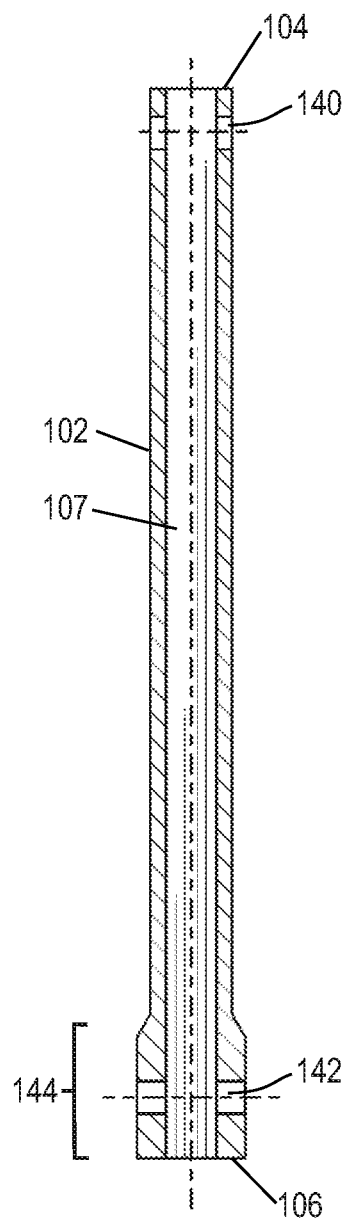
FIG. 11 is a cross-sectional view of the torsion tube of the hydraulic steering gear assembly of FIG. 10.
Figure 12:
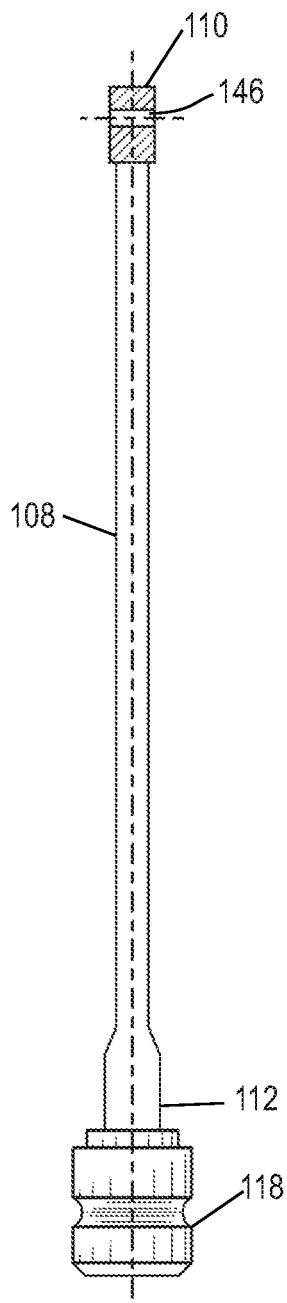
FIG. 12 is a partial cross-sectional view of the transfer shaft and the second input shaft of the hydraulic steering gear assembly of FIG. 10.

FIGS. 11-14B illustrate various components of the hydraulic steering gear assembly 100 shown in FIG. 10. FIG. 11 illustrates the torsion tube 102, which includes a bore 107 (of constant width or diameter), first transverse pin receiving holes 140 proximate to the first end 104, and second transverse pin receiving holes 142 proximate to the second end 106. The torsion tube 102 may further include an increased outer diameter portion 144 proximate to the second end 102. FIG. 12 illustrates the transfer shaft 108 and the second input shaft 118. As noted previously, the transfer shaft 108 and the second input shaft 118 may either be coupled to one another, or may be integrally formed with one another. The transfer shaft 108 includes a transverse pin receiving hole 146 proximate to the first end 110, and is either coupled or attached to the second input shaft 118 proximate to the second end portion 112 of the transfer shaft 108.

Figure 13A:
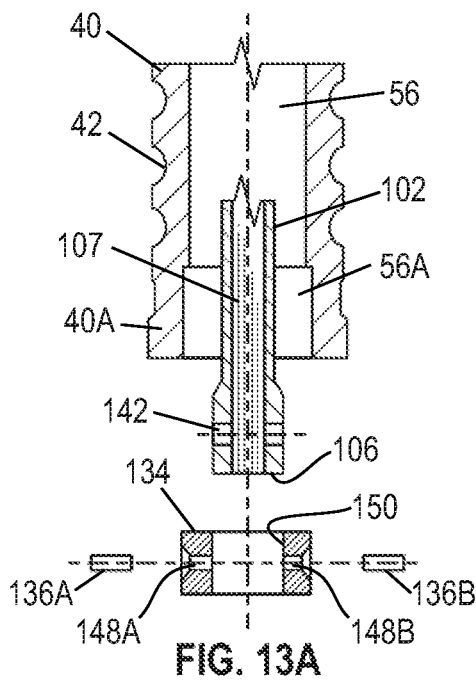
FIG. 13A is an exploded cross-sectional view of a distal end (i.e., distal from the first input shaft) of the torsion tube and the worm shaft, as well as an intermediate joining member and as well as first and second connecting pins permitting the torsion tube to be coupled to the worm shaft, with all of the foregoing items being part of the steering gear assembly of FIG. 10.
Figure 13B:
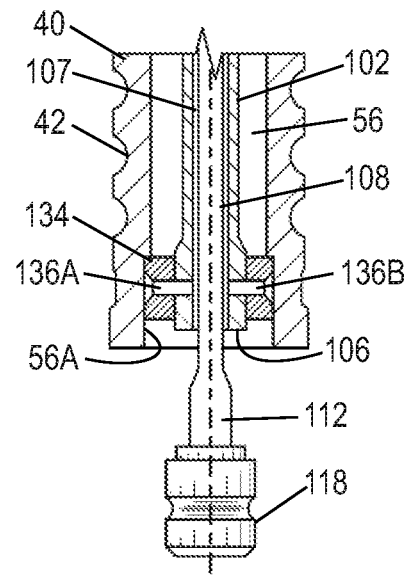
FIG. 13B is a cross-sectional view of the components of FIG. 13A in an assembled state, with the transfer shaft inserted into the bore of the torsion tube.

FIG. 13A is an exploded cross-sectional view illustrating distal portions of the torsion tube 102 and the worm shaft 40, as well an intermediate joining member 134 and associated connecting pins 136A, 136B. The worm shaft 40 includes outer spiral grooves 42 and an inner bore 56 that receives the torsion tube 102, and includes a widened bore portion 56A configured to receive the intermediate joining member 134 and positioned along an end portion 40A of the worm shaft 40. The intermediate joining member 134 defines transverse pin receiving holes 148A, 148B configured to receive connecting pins 136A, 136B, and includes a longitudinal bore 150 configured to receive the second end 106 of the torsion tube 102. The use of two short connecting pins 136A, 136B versus a single longer connecting pin (e.g., connecting pin 66 shown in FIG. 6A) is necessary to prevent obstruction of the bore 107 of the torsion tube 102, to permit the transfer shaft 108 (shown in FIG. 13B) to rotate within the bore 107. FIG. 13B illustrates the same items shown in FIG. 13A following assembly, with the connecting pins 136A, 136B extending through transverse pin receiving holes 142, 148A, 148B defined in the torsion tube 102 and the intermediate joining member 134, respectively, and with the intermediate joining member 134 received within the widened bore portion 56A of the worm shaft 40. FIG. 13B also shows the transfer shaft 108 inserted into the bore 107 of the torsion tube 102, with a second end portion 112 of the transfer shaft 108 joined or coupled with the second input shaft 118.

Figure 14A:
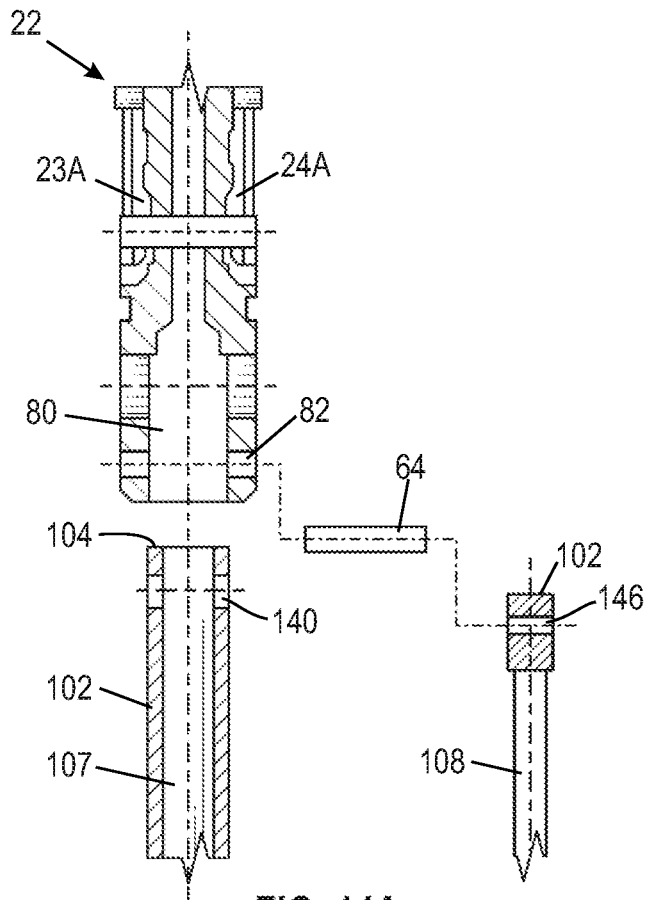
FIG. 14A is an exploded, cross-sectional view showing proximal portions (i.e., proximal to the first input shaft) of the transfer shaft and torsion tube, in addition to the rotatable valve member and a connecting pin enabling connection between the transfer shaft, the torsion tube, and the rotatable valve, with the foregoing items being part of the hydraulic steering gear assembly of FIG. 10.
Figure 14B:
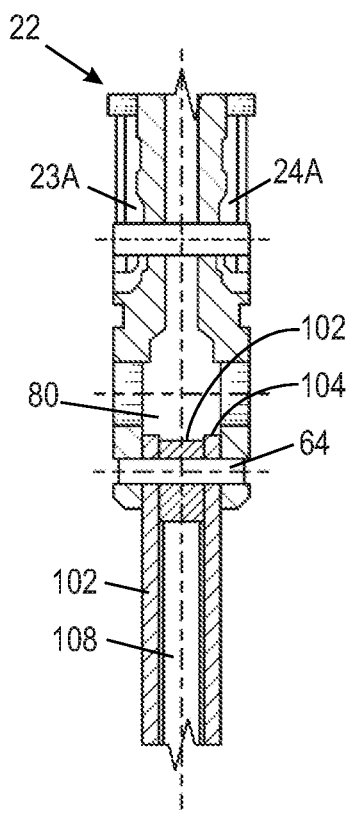
FIG. 14B is a cross-sectional view of the components of FIG. 14A in an assembled state.

FIG. 14A is an exploded, cross-sectional view showing proximal portions of the transfer shaft 108 and the torsion tube 102, in addition to the rotatable valve member 22 and a connecting pin 64 enabling connection between the transfer shaft 108, the torsion tube 102, and the rotatable valve 22. The rotatable valve member 22 includes first and second fluid ports 23A, 24A as well as a recess 80 defining transverse pin receiving holes 82. The torsion tube 102 includes a bore 107 as well as transverse pin receiving holes 140 proximate to the first end 104 thereof. The transfer shaft 108 includes a transverse pin receiving hole 146 proximate to a first end 104 thereof. The recess 80 of the rotatable valve member 22 is dimensioned to receive the first end 104 of the torsion tube 102. FIG. 14B illustrates the same items shown in FIG. 14A following assembly, with the connecting pin 64 extending through transverse pin receiving holes 140, 146, 82 defined in the torsion tube 102, the transfer shaft 108, and the rotatable valve member 22, respectively. In this manner, the connecting pin 64 serves to couple first end portions of both the torsion tube 102 and the transfer shaft 108 to the rotatable valve member 22. As noted previously, the rotatable valve member 22 is coupled to the first input shaft 18 (shown in FIG. 10), the transfer shaft 108 is coupled to the second input shaft 108 (shown in FIG. 10), and the torsion tube 102 is coupled to the worm shaft 40. By virtue of the mechanical coupling of the torsion tube 102, the transfer shaft 108, and the rotatable valve member 22, the torsion tube 102 can exert a rotational restoring force to the rotatable valve member 22 (and also the first input shaft), and also exert a rotational restoring force to the transfer shaft 108 (and also the second input shaft).

Figure 9A:
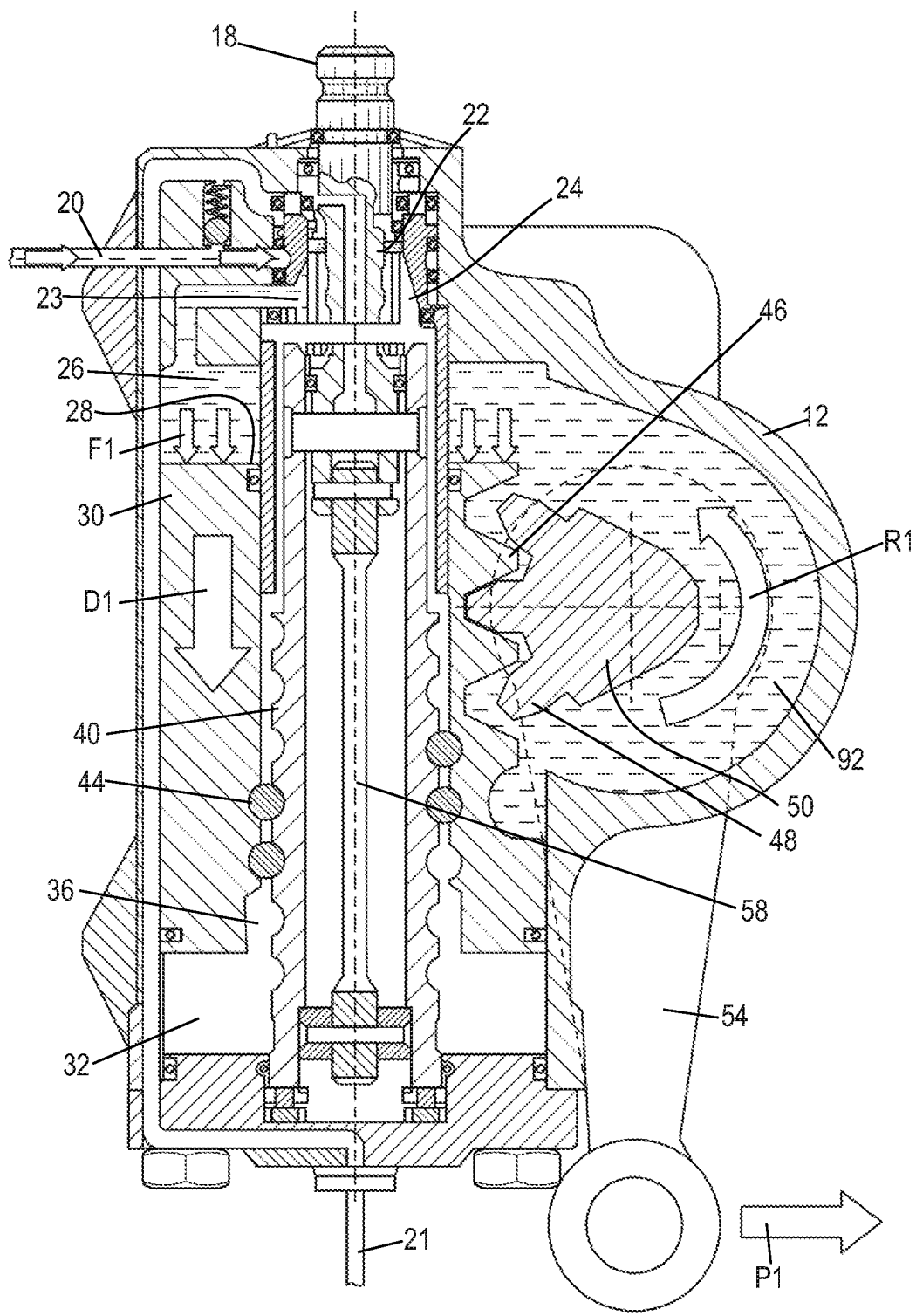
FIG. 9A is a cross-sectional view of the conventional steering gear assembly of FIG. 1 following introduction of hydraulic fluid into a first (proximal) chamber to exert force on the ball nut piston to initiate counterclockwise rotation of the sector gear.
Figure 9B:
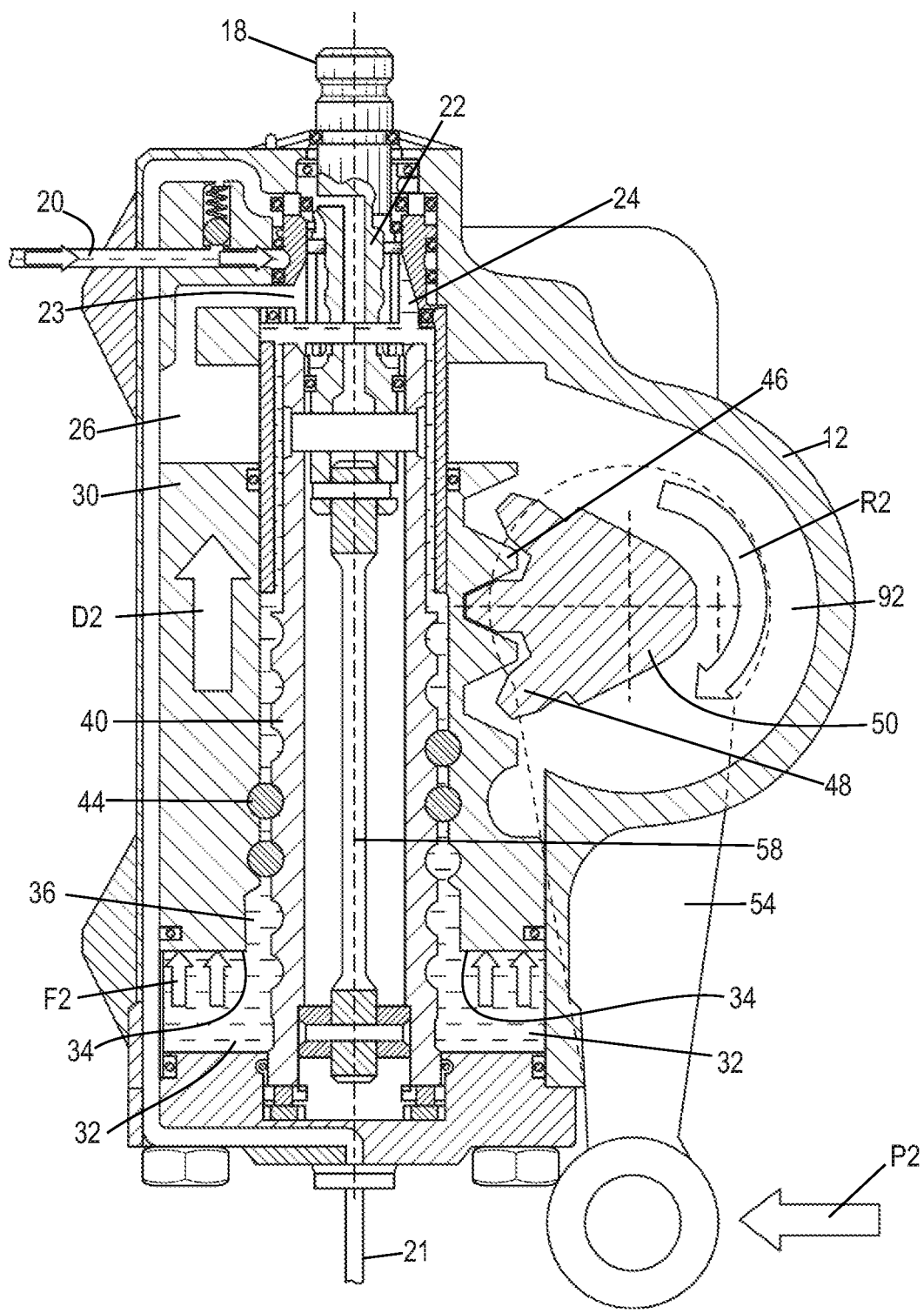
FIG. 9B is a cross-sectional view of the conventional steering gear assembly of FIG. 1 following introduction of hydraulic fluid into a second (distal) chamber to exert force on the ball nut piston to initiate clockwise rotation of the sector gear.

During operation of the steering gear assembly 100 of FIG. 10, torque may be applied to the first input shaft 18 by manipulation of a vehicle steering wheel (not shown) and/or applied to the second input shaft 118 by the motor 120. In certain embodiments, the motor 120 comprises an electric motor. In certain embodiments, the motor 120 may be coupled with a control system and sensors (not shown) to permit a vehicle to be steered autonomously without input from a human driver. In other embodiments, the motor 120 may be configured to provide dynamic steering control (e.g., including functionality provided by Volvo's VDS system as described previously herein). Rotation of the first and/or second input shafts 18, 118 and the rotatable valve member coupled thereto causes pressurized hydraulic fluid to pass through the rotatable valve member 22 to the first or second downstream passages 23, 24 and corresponding first or second downstream chambers 26, 32, causing the ball nut piston 30 to translate, thereby causing rotation of the sector shaft 50 and the Pitman arm 54 coupled thereto. Upon rotation of the first and/or second input shafts 18, 118, a rotational restoring force is provided by the torsion tube 102 to tend to cause the rotatable valve member 22 (and the entire steering gear assembly 100) to return to a neutral position. Aside from addition of the electric 120, transfer shaft 108, torsion tube 102, and the end cap 114, operation of the steering gear assembly 100 of FIG. 10 is substantially in accordance with operation of the steering gear 10 as described in connection with FIGS. 1, 9A, and 9B.

Figure 15:
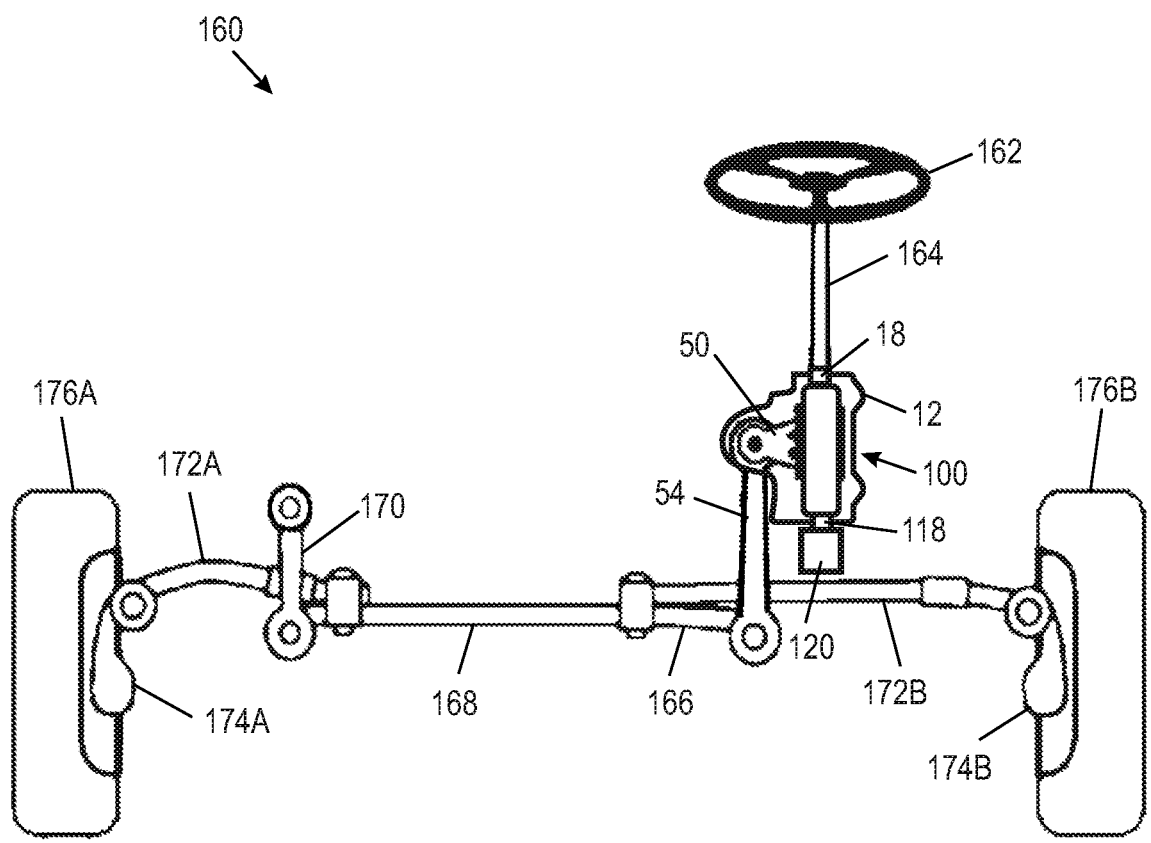
FIG. 15 is an upper schematic view illustration of components of a steering system including a hydraulic steering gear assembly according to an embodiment of the present disclosure receiving inputs from a steering wheel and a motor, and being coupled with steered wheels of a vehicle.

FIG. 15 is an upper schematic view illustration of components of an exemplary steering system 160, including a hydraulic steering gear assembly 100 according to an embodiment of the present disclosure receiving inputs from a steering wheel 162 and a motor 120. The first input shaft 18 of the steering gear assembly 100 extends into the housing 12 and is coupled with an intermediate steering shaft 164 that receives torque from a steering wheel 162. The second input shaft 118 of the steering gear assembly 100 is arranged opposite the first input shaft 18 (with the steering gear assembly 100 arranged therebetween), and is coupled to the electric motor 120. The sector shaft 50 of the steering gear assembly 100 is coupled with the Pitman arm 54, which is coupled by a drag link 166 to a track rod 168, which extends between first and second tie rods 172A, 172B. An end of the track rod 168 is also coupled to an idler arm 170 arranged roughly parallel to the Pitman arm 54. The first and second tie rods 172A, 172B are coupled with steering arms 174A, 174B that are arranged to adjust the turning angle of steered wheels 176A, 176B, respectively, of a vehicle. It is to be appreciated that the steering system 160 merely represents one example of a system that may incorporate the steering gear assembly 100, and that steering systems according to other configurations may utilize the steering gear assembly 100 to permit hydraulic steering gear assemblies of conventional driver-operated vehicles to be remanufactured and coupled with motors (or other mechanical torque-supplying elements) to enable autonomous and/or driver-assisted operation.

One aspect of the disclosure relates to a remanufacturing kit for a steering gear assembly being controllable by a first rotatable input shaft to enable the steering assembly to be controllable by the first rotatable input shaft and by a second rotatable input shaft that generally opposes the first rotatable input shaft. In certain embodiments, such a remanufacturing kit includes any combination of two or more components that permit the steering gear assembly 10 of FIG. 1 to be converted to the steering gear assembly 100 of FIG. 10. In certain embodiments, a remanufacturing kit includes the torsion tube 102, the transfer shaft 108, and the end cover 114 shown in FIG. 10. A remanufacturing kit may further include the intermediate joining member 134 and first and second distal pins 136A, 136B shown in FIG. 10, and/or the motor 120 of FIG. 10.

Another aspect of the disclosure relates to a method for remanufacturing a steering gear assembly controllable by a first rotatable input shaft to cause the vehicular steering system to be controllable by the first rotatable input shaft and by a second rotatable input shaft that generally opposes the first rotatable input shaft. Generally, such a method may include replacing (i) a torsion bar configured to apply a rotational restoring force to the first rotatable input shaft with (ii) a torsion tube configured to apply a rotational restoring force to the first rotatable input shaft, wherein the first rotatable input shaft is coupled with a rotatable valve member arranged between a hydraulic fluid inlet and first and second downstream passages; and providing a transfer shaft extending within an interior of the torsion tube and coupled to the rotatable valve member, with the transfer shaft extending between the second rotatable input shaft and the rotatable valve member. The rotatable valve member is configured to selectively direct hydraulic fluid to the first downstream passage or to the second downstream passage. More specifically, a remanufacturing method may include disassembly steps including removing an existing end cover of a conventional steering gear assembly, and decoupling a torsion bar from a rotatable valve member. A remanufacturing method may include reassembly steps including coupling a torsion tube and a transfer shaft (with at least a portion of the transfer shaft arranged within the torsion tube) to the rotatable valve member, and with the torsion tube and the transfer shaft extending through a bore of a worm shaft. Reassembly steps of such a remanufacturing method may further include installing a new end cover to a housing of the steering gear assembly (e.g., using bolts), with a portion of the transfer shaft and/or a second rotatable input shaft associated with the transfer shaft extending through a rotary seal of the new end cover. Either concurrently or thereafter, an electric motor may be coupled to the second rotatable input shaft (which may be integrally formed with or otherwise coupled to the transfer shaft).

Utilization of a remanufacturing kit and remanufacturing methods according to various embodiments disclosed herein may provide one or more of the following technical benefits: enabling steering gear assemblies of conventional driver-operated vehicles to be augmented with electric motors to enable autonomous or driver-assisted operation with low cost, with limited downtime, and/or without requiring relocation of a steering gear assembly or output components and attendant recertification of an entire steering system.

While the invention has been described herein in reference to specific aspects, features, and illustrative embodiments, it will be appreciated that the utility of the invention is not thus limited, but rather extends to and encompasses numerous other variations, modifications and alternative embodiments, as will suggest themselves to those of ordinary skill in the field of the present invention, based on the disclosure herein. Various combinations and sub-combinations of the structures described herein are contemplated and will be apparent to a skilled person having knowledge of this disclosure. Any of the various features and elements as disclosed herein may be combined with one or more other disclosed features and elements unless indicated to the contrary herein. Correspondingly, the invention as hereinafter claimed is intended to be broadly construed and interpreted, as including all such variations, modifications and alternative embodiments, within its scope and including equivalents of the claims.

What is claimed is:

1. A steering gear assembly for a vehicle, the steering gear assembly comprising:
    a first rotatable input shaft;
    a rotatable valve member coupled with the first rotatable input shaft, wherein the rotatable valve member is configured to control flow of hydraulic fluid from a hydraulic fluid inlet to a first downstream passage and a second downstream passage;
    a torsion tube configured to apply a rotational restoring force to the rotatable valve member and the first rotatable input shaft;
    a second rotatable input shaft; and
    a transfer shaft extending within an interior of the torsion tube, coupled to the rotatable valve member and being integrally formed with the second rotatable input shaft, such that the rotatable valve member is configured to rotate upon receipt of torque from either of the first rotatable input shaft or the second rotatable input shaft.

2. The steering gear assembly of claim 1, wherein the first rotatable input shaft is configured to receive a first rotational force supplied by manual rotation of a steering wheel, and the second rotatable input shaft is configured to receive a second rotational force supplied by a motor or another mechanical torque-supplying element.

3. The steering gear assembly of claim 1, wherein the rotatable valve member is integrally formed with the first rotatable input shaft.

4. The steering gear assembly of claim 1, further comprising:
    a ball nut piston operatively coupled with a sector shaft to cause the sector shaft to rotate in a first rotational direction when the ball nut piston is displaced in a first linear direction, and to cause the sector shaft to rotate in a second rotational direction when the ball nut piston is displaced in a second linear direction, wherein the second rotational direction is opposite the first rotational direction, and the second linear direction is opposite the first linear direction;
    wherein rotation of the first rotatable input shaft and the second rotatable input shaft causes the rotatable valve member to selectively admit fluid into the first downstream passage or the second downstream passage to displace the ball nut piston in the first linear direction or the second linear direction, respectively.

5. The steering gear assembly of claim 4, wherein:
    the ball nut piston defines a piston bore having an inner surface and defining a first spiral groove;
    the steering gear assembly further comprises a worm shaft extending through the ball nut piston bore, including an outer surface defining a second spiral groove, and defining a worm shaft bore containing the torsion tube and at least a portion of the transfer shaft; and
    a plurality of recirculating balls positioned between the first spiral groove and the second spiral groove.

6. The steering gear assembly of claim 5, further comprising:
    a housing defining at least one cavity containing the ball nut piston, the worm shaft, the sector shaft, the torsion tube, the rotatable valve member, and the transfer shaft; and
    an end cover removably coupled to the housing and bounding at least a portion of the cavity, wherein the end cover comprises a rotary seal permitting rotation of at least one of the transfer shaft or the second rotatable input shaft relative to the end cover.

7. The steering gear assembly of claim 6, wherein the end cover includes a hydraulic fluid outlet that is displaced relative to the rotary seal.

8. The steering gear assembly of claim 6, wherein the end cover includes an end face and at least one lateral face, the rotary seal is positioned in or on the end face, and the hydraulic fluid outlet is positioned in or on the at least one lateral face.

9. The steering gear assembly of claim 6, wherein the end cover comprises a recess configured to receive an end portion of the worm shaft.

10. A remanufacturing kit for a steering gear assembly being controllable by a first rotatable input shaft to enable the steering assembly to be controllable by the first rotatable input shaft and by a second rotatable input shaft that generally opposes the first rotatable input shaft, the remanufacturing kit comprising:
 a torsion tube configured to be received within an inner bore of a worm shaft of the steering gear assembly, configured to be coupled proximate to a first end thereof to a rotatable valve member of the steering gear assembly, and configured to be coupled at a second end thereof along the inner bore of the worm shaft;
 a transfer shaft configured to be received within an inner bore of the torsion tube, and configured to be coupled at a first end thereof to both the rotatable valve member and the first end of the torsion tube, wherein the transfer shaft is integrally formed with the second rotatable input shaft; and
 an end cover configured to be removably coupled to a housing of the steering gear assembly, wherein the end cover comprises a rotary seal configured to permit rotation of the transfer shaft relative to the end cover.

11. The remanufacturing kit of claim 10, wherein the end cover includes a hydraulic fluid outlet that is displaced relative to the rotary seal.

12. The remanufacturing kit of claim 10, wherein the second rotatable input shaft is configured for coupling to a motor or another mechanical torque-supplying element.

13. The remanufacturing kit of claim 10, wherein the remanufacturing kit further comprises an electric motor coupleable to the second rotatable input shaft.

14. The remanufacturing kit of claim 10, further comprising:
 an intermediate joining member configured to be arranged between the second end of the torsion tube and an inner surface of the worm shaft, wherein the intermediate joining member comprises a longitudinal bore, a first transverse pin receiving hole, and a second transverse pin receiving hole, wherein the longitudinal bore is configured to receive a second end portion of the torsion tube;
 a first distal retaining pin configured to extend through a first distal pin receiving hole of the torsion tube and through the first transverse pin receiving hole of the intermediate joining member; and
 a second distal retaining pin configured to extend through a second distal pin receiving hole of the torsion tube and through the second transverse pin receiving hole of the intermediate joining member.

15. The remanufacturing kit of claim 10, wherein:
 the torsion tube defines a first proximal pin receiving hole and a second proximal pin receiving hole;
 the transfer shaft comprises a transfer shaft pin receiving hole;
 the torsion tube and the transfer shaft are configured to be coupled to the rotatable valve member via a proximal retaining pin extending through the first proximal pin receiving hole, the transfer shaft pin receiving hole, the second proximal pin receiving hole, and pin receiving holes defined in the rotatable valve member.

16. A method for remanufacturing a steering gear assembly controllable by a first rotatable input shaft to cause a vehicular steering system to be controllable by the first rotatable input shaft and by a second rotatable input shaft that generally opposes the first rotatable input shaft, the method comprising:
 replacing (i) a torsion bar configured to apply a rotational restoring force to the first rotatable input shaft with (ii) a torsion tube configured to apply a rotational restoring force to the first rotatable input shaft, wherein the first rotatable input shaft is coupled with a rotatable valve member arranged between a hydraulic fluid inlet and first and second downstream passages, with the rotatable valve member being configured to selectively direct hydraulic fluid to the first downstream passage or to the second downstream passage; and
 providing a transfer shaft extending within an interior of the torsion tube and coupled to the rotatable valve member, wherein the transfer shaft extends between the second rotatable input shaft and the rotatable valve member, and the rotatable valve member is configured to rotate upon receipt of torque from either of the first rotatable input shaft or the second rotatable input shaft.

17. The method of claim 16, further comprising replacing an end cover of a housing of the steering gear assembly with a replacement end cover, wherein the replacement end cover comprises a rotary seal permitting rotation of at least one of the transfer shaft or the second rotatable input shaft relative to the replacement end cover.

18. The method of claim 17, further comprising:
 providing an intermediate joining member between an inner surface of a worm shaft and an end portion of the torsion tube proximate to the replacement end cover;
 inserting a first distal retaining pin through a first distal pin receiving hole of the torsion tube and through a first transverse pin receiving hole of the intermediate joining member; and
 inserting a second distal retaining pin through a second distal pin receiving hole of the torsion tube and through a second transverse pin receiving hole of the intermediate joining member.

19. The method of claim 16, wherein:
 the torsion tube comprises a first proximal pin receiving hole and a second proximal pin receiving hole;
 the transfer shaft comprises a transfer shaft pin receiving hole; and
 the method further comprises coupling the transfer shaft, torsion tube, and rotatable valve member by inserting a proximal retaining pin through the first proximal pin receiving hole, the transfer shaft pin receiving hole, the second proximal pin receiving hole, and pin receiving holes defined in the rotatable valve member.

* * * * *